US008844628B2

(12) United States Patent
Le Roy-Delage et al.

(10) Patent No.: US 8,844,628 B2
(45) Date of Patent: *Sep. 30, 2014

(54) SELF-ADAPTIVE CEMENTS

(75) Inventors: Sylvaine Le Roy-Delage, Paris (FR);
Laure Martin, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 275 days.

This patent is subject to a terminal disclaimer.

(21) Appl. No.: 13/357,592

(22) Filed: Jan. 24, 2012

(65) Prior Publication Data

US 2012/0205106 A1 Aug. 16, 2012

(30) Foreign Application Priority Data

Feb. 11, 2011 (EP) .................................. 11154155

(51) Int. Cl.
*E21B 33/14* (2006.01)
*C04B 24/36* (2006.01)
*C04B 28/02* (2006.01)
*C09K 8/467* (2006.01)
*C09K 8/493* (2006.01)

(52) U.S. Cl.
CPC ................. *C09K 8/493* (2013.01); *C04B 24/36* (2013.01); *C04B 28/02* (2013.01)
USPC ........... 166/293; 106/671; 106/802; 106/823; 166/294; 166/295; 507/219; 507/231; 507/232; 507/269

(58) Field of Classification Search
None
See application file for complete search history.

(56) References Cited

U.S. PATENT DOCUMENTS

| | | | |
|---|---|---|---|
| 3,036,633 A | 5/1962 | Myhew | |
| 3,220,863 A * | 11/1965 | Mayhew | 166/293 |
| 4,482,379 A | 11/1984 | Dibrell et al. | |
| 5,518,996 A | 5/1996 | Maroy et al. | |
| 5,575,841 A | 11/1996 | Dry | |
| 5,660,624 A | 8/1997 | Dry | |
| 5,989,334 A | 11/1999 | Dry | |
| 6,261,360 B1 | 7/2001 | Dry | |
| 6,296,057 B2 | 10/2001 | Thiercelin | |
| 6,458,198 B1 | 10/2002 | Baret et al. | |
| 6,527,849 B2 | 3/2003 | Dry | |
| 6,645,288 B1 | 11/2003 | Dargaud et al. | |
| 6,832,651 B2 | 12/2004 | Ravi et al. | |
| 6,902,001 B2 | 6/2005 | Dargaud et al. | |
| 6,907,929 B2 | 6/2005 | Leroy-Delage et al. | |
| 7,341,106 B2 * | 3/2008 | Reddy et al. | 166/295 |
| 7,527,095 B2 | 5/2009 | Bloess et al. | |
| 7,530,396 B1 | 5/2009 | Reddy et al. | |
| 7,578,347 B2 | 8/2009 | Bosma et al. | |
| 7,607,484 B2 * | 10/2009 | Roddy et al. | 166/293 |
| 2007/0017676 A1 | 1/2007 | Reddy et al. | |
| 2007/0056730 A1 * | 3/2007 | Keese et al. | 166/291 |
| 2007/0137528 A1 * | 6/2007 | Le Roy-Delage et al. | 106/718 |
| 2007/0204765 A1 | 9/2007 | Roy-Delage et al. | |
| 2008/0099203 A1 | 5/2008 | Mueller et al. | |
| 2009/0071650 A1 | 3/2009 | Roddy et al. | |
| 2011/0120715 A1 * | 5/2011 | Le Roy-Delage et al. | 166/292 |

FOREIGN PATENT DOCUMENTS

| | | |
|---|---|---|
| CA | 2117276 | 6/2006 |
| DE | 1206342 | 12/1965 |
| EP | 1176126 | 1/2002 |
| EP | 1129047 | 11/2002 |
| WO | 00/37387 | 6/2000 |
| WO | 01/70646 | 9/2001 |
| WO | 03/068708 | 8/2003 |
| WO | 2004/101951 | 11/2004 |
| WO | 2004/101952 | 11/2004 |
| WO | 2009/019471 | 2/2009 |
| WO | 2010/146334 | 12/2010 |

OTHER PUBLICATIONS

Bouras H et al.: "Responsive Cementing Material Prevents Annular Leaks in Gas Wells," paper SPE 116757 (2008).
Cavanagh P et al.: "Self-Healing Cement—Novel Technology to Achieve Leak-Free Wells," paper SPE 105781 (2007).
Dry, CM: "Three designs for the internal release of sealants, adhesives and waterproofing chemicals into concrete to reduce permeability." Cement and Concrete Research 30 (2000) 1969-1977.
Le Roy-Delage S et al.: "Self-Healing Cement System—A Step Forward in Reducing Long-Term Environmental Impact," paper SPE 128226 (2010).
Roth J et al.: "Innovative Hydraulic Isolation Material Preserves Well Integrity," paper SPE 112715 (2008).
Smith D.K. et al.: "Gilsonite leads fight against lost circulation", Petroleum Engineer International, Hart Publication, US, vol. 61, No. 4, Apr. 1, 1989, pp. 42-46.

* cited by examiner

*Primary Examiner* — George Suchfield
(74) *Attorney, Agent, or Firm* — Michael Dae

(57) ABSTRACT

A self-adaptive cement formulation includes cement, water and asphaltite-mineral particles. The set cement demonstrates self-healing properties when exposed to methane, and is particularly suited for well-cementing applications. After placement and curing, the self-healing properties help maintain zonal isolation should bonding be disrupted between the set cement and the formation or a casing string, should cracks or defects appear in the set-cement matrix, or both.

19 Claims, 4 Drawing Sheets

SELF-ADAPTIVE CEMENTS

CROSS REFERENCED APPLICATIONS

This application claims the benefit of the disclosure of European patent application number 11154155.3 filed on Feb. 11, 2011 incorporated by reference in its entirety.

TECHNICAL FIELD

The present disclosure relates to self-adaptive cements. In particular, the disclosure relates to set cements that are "self-healing," i.e., formulations that can adapt to compensate for changes or faults in the physical structure of the cement, or which adapt their structure after the setting phase of the cement in the cementing of oil, gas, water or geothermal wells, or the like.

BACKGROUND

During the construction of wells, cement is used to secure and support casing inside the well and prevent fluid communication between the various underground fluid-containing layers or the production of unwanted fluids into the well.

Various approaches have been developed to prevent failure of the cement sheath. One approach is to design the cement sheath to take into account physical stresses that might be encountered during its lifetime. Such an approach is described for example in U.S. Pat. No. 6,296,057. Another approach is to include, in the cement composition, materials that improve the physical properties of the set cement. U.S. Pat. No. 6,458,198 describes the addition of amorphous metal fibers to the cement slurry to improve its strength and resistance to impact damage. EP 1129047 and WO 00/37387 describe the addition of flexible materials (rubber or polymers) to the cement to confer a degree of flexibility on the cement sheath.

Nevertheless, the above-described approaches do not allow restoration of zonal isolation once the cement sheath has actually failed due to the formation of cracks, gaps or microannuli.

A number of self-healing concretes are known for use in the construction industry. These are described for example in U.S. Pat. No. 5,575,841, U.S. Pat. No. 5,660,624, U.S. Pat. No. 5,989,334, U.S. Pat. No. 6,261,360 and U.S. Pat. No. 6,527,849, and in the following document. Dry CM: "Three designs for the internal release of sealants, adhesives, and waterproofing chemicals into concrete to reduce permeability", *Cement and Concrete Research* 30 (2000) 1969-1977. However, none of these self-healing concretes are immediately applicable to well cementing operations because of the need for the material to be pumpable during placement.

"Self-healing" cements were eventually developed for oil and gas industry applications such as described in US 2007/0204765 A1, WO 2004/101951 and WO 2004/101952 A1. These formulations generally contain additives that react and/or swell upon contact with downhole fluids. When cement-sheath deterioration occurs, exposing the cement matrix or cement-sheath surfaces to downhole fluids, the additives respond and seal cracks or fissures, thereby restoring cement-matrix integrity and zonal isolation. Well cements are potentially exposed to several fluid types during service, including liquid and gaseous hydrocarbons, water, brines and/or carbon dioxide. Thus, depending on the anticipated wellbore environment, it would be desirable to incorporate additives that are able to respond to one or more types of downhole fluids.

Despite the many valuable contributions from the art, it would still be valuable to have self-healing set cements that respond to formation fluids containing high concentrations of gaseous hydrocarbons.

SUMMARY

The present embodiments allow improvements by providing set cements that are self-healing when exposed to hydrocarbons, and methods by which they may be prepared and applied in subterranean wells.

In an aspect, embodiments relate to methods for maintaining zonal isolation in a subterranean well that penetrates one or more hydrocarbon-containing formations.

In a further aspect, embodiments relate to uses of asphaltite-mineral particles to impart self-healing properties to a cement formulation that is placed in a subterranean well penetrating one or more hydrocarbon-containing formations.

In yet a further aspect, embodiments relate to methods for cementing a subterranean well that penetrates one or more hydrocarbon-containing formations. The methods comprising pumping a cement slurry comprising asphaltite-mineral particles into the well, and allowing the cement slurry to form a cement sheath that, once set, will self-repair in contact with hydrocarbons contacting it.

In yet a further aspect, embodiments relate to methods for preparing a self-healing cement composition.

DETAILED DESCRIPTION

Figure 1:
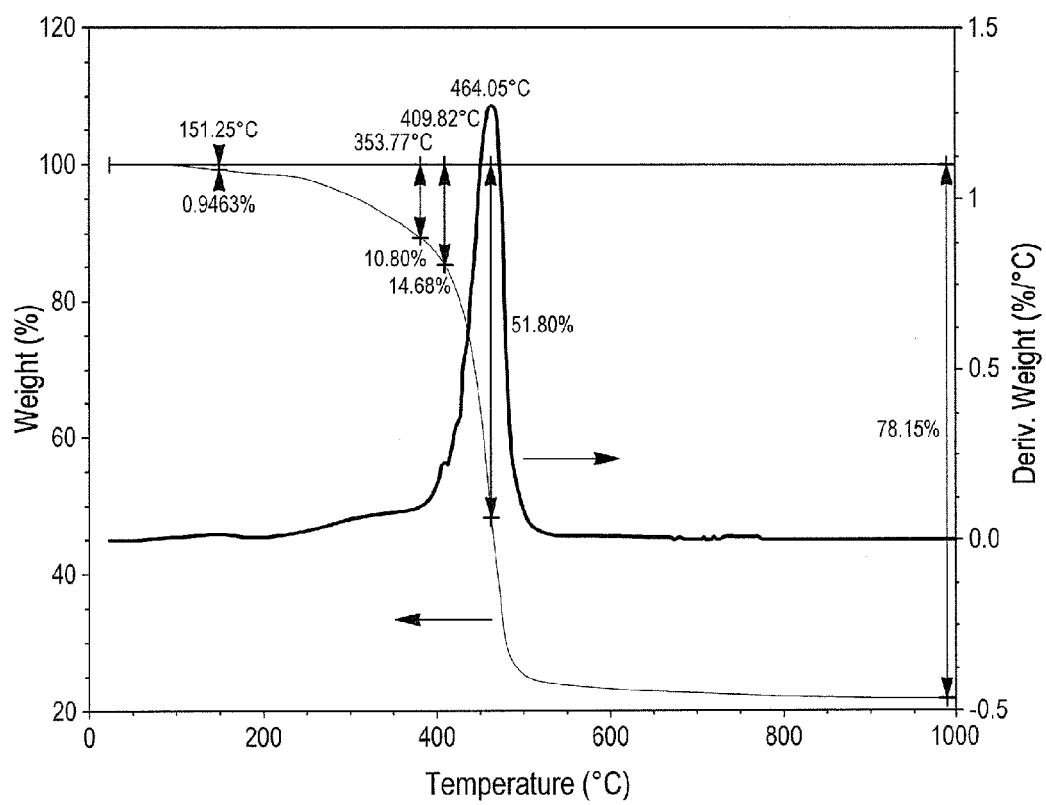
FIG. 1 is a thermogravimetric analysis (TGA) thermogram depicting the thermal-stability behavior of Gilsonite™.

At the outset, it should be noted that in the development of any such actual embodiment, numerous implementations—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific points, it is to be understood that inventors appreciate and understand that any and all data points within the range are to be considered to have been specified, and that inventors possessed knowledge of the entire range and all points within the range.

This disclosure concerns compositions for cementing subterranean wells, comprising a settable material, water and at least one additive that swells in the event of structural failure of or damage to the set material (i.e., the cement sheath). Such behavior restores and maintains a physical and hydraulic barrier in the failure zone. As a result, zonal isolation in the subterranean well is preserved. Such set cements are said to be "self-healing" or "self-repairing." In the following disclosure, both terms are used indifferently, and are to be understood as the capacity of a cement sheath to restore hydraulic isolation after suffering a matrix-permeability increase, structural defects such as cracks or fissures, or debonding from casing or formation surfaces (i.e., micro annuli).

Examples of settable materials include (but are not limited to) Portland cement, microcement, geopolymers, resins, mixtures of cement and geopolymer, plaster, lime-silica mixtures, resins, phosphomagnesium cements and chemically bonded phosphate ceramics (CBPCs).

As stated earlier, improved self-healing set cements that operate in an environment containing high concentrations of gaseous hydrocarbons, methane in particular, would be beneficial to the industry. Surprisingly, the inventors have discovered that self-healing properties may be achieved in this environment by incorporating asphaltite-mineral particles in the cement formulation. Asphaltite minerals are hard, solid bitumens whose chief consituents, asphaltenes, have very large molecules. They are typically dark brown to black in color. Common asphaltites include (but are not limited to) uintaite, unitahite (both of which are usually sold as Gilsonite™ from American Gilsonite Company, Bonanza, Utah, USA.), glance pitch and grahamite. Of these, unitaite and unitahite are preferred.

Further embodiments relate to methods for maintaining zonal isolation in a subterranean well having a borehole that penetrates one or more hydrocarbon-containing formations. The method comprises pumping a cement slurry comprising asphaltite-mineral particles into the well, and allowing the cement slurry to form a cement sheath. Those skilled in the art will recognize that a cement slurry is generally considered to be pumpable when its viscosity is less than or equal to 1000 mPa-s at a shear rate of 100 s$^{-1}$ throughout the temperature range the slurry will experience during placement in the well. The cement sheath may be located between the well casing and the borehole wall, or between the casing and another casing string. If microannuli, cracks or defects occur in the cement sheath, the casing-cement interface or the cement-borehole wall interface, the particles will be exposed to formation hydrocarbons, causing them to swell and enabling the cement sheath to have self-healing properties.

Further embodiments aim at uses of asphaltite-mineral particles to impart self-healing properties to a set cement sheath in a subterranean well that penetrates one or more hydrocarbon-containing formations. The particles swell when contacted by hydrocarbons from the formation, in particular gaseous hydrocarbons.

The asphaltite-mineral particle concentration is preferably between about 10% and 75% by volume of solids in the cement slurry, also known as percentage by volume of blend (BVOB). A more preferred particle concentration lies between about 20% and 50% BVOB. The particle-size range is preferably between about 50 μm and 900 μm, and more preferably between about 90 μm and 800 μm. The particles may be added as spheres, ovoid particles, fibers, meshes or ribbons.

One of the current challenges that the industry is facing is the presence in some wells of high concentration of gaseous hydrocarbons such as methane, propane and/or ethane. Such gaseous hydrocarbons are much more volatile than those in liquid form, and have the tendency to penetrate the failures and/or microannuli that can be present in the cement sheath, thereby modifying the pressure and safety conditions of the well as the integrity is diminished. The inventors have determined that the compositions according to the present invention can solve this problem, even in the presence of very high concentrations of gaseous hydrocarbon. In a preferred embodiment, the gaseous-hydrocarbon concentration in the hydrocarbon fluid is greater than about 80 mol %, and more preferably above about 91 mol %. In addition, the hydrocarbon pressure to which the cement sheath is exposed is preferably above about 11 MPa, more preferably above about 13 MPa and most preferably above about 15 MPa. Pressures as high as 200 MPa may even be envisaged, preferably 100 MPa.

The asphaltite-mineral particles may be further encapsulated by a protective layer. The layer may rupture or degrade upon exposure to one or more triggers, including (but not limited to) contact with a hydrocarbon, propagation of a crack within the set-cement matrix, time and temperature.

In addition to the asphaltite-mineral particles, the cement slurries may also comprise customary additives such as retarders, accelerators, extenders, fluid-loss-control additives, lost-circulation additives, gas-migration additives, gas-generating additives and antifoam agents. Furthermore, the cement slurries may contain additives that enhance the flexibility and/or toughness of the set cement. Such additives include (but are not limited to) flexible particles having a Young's modulus below about 5000 MPa and a Poisson's ratio above about 0.3. Preferably, such particles would have a Young's modulus below about 2000 MPa. Examples include (but are not limited to) polypropylene, polyethylene, acrylonitrile butadiene, styrene butadiene and polyamide. Such additives may also include fibers selected from the list comprising polyamide, polyethylene and polyvinyl alcohol. Metallic microribbons may also be included.

The asphaltite-mineral particles may also be used in engineered-particle-size cement formulations involving trimodal or quadrimodal blends of small, medium and coarse particles. Such as formulations exemplified in U.S. Pat. No. 5,518,996 and/or CA 2,117,276 incorporated herein by reference in their entirety. The cement compositions preferably have densities between about 1200 and 1600 kg/m$^3$, and solid-volume fractions (SVF) between about 45-58%. If necessary, the slurry densities may be further decreased to about 1050 kg/m$^3$ by adding any known low-specific-gravity additives, preferably hollow ceramic or glass microspheres and mixtures thereof.

The asphaltite-mineral particles may also be employed in cement compositions that comprise an external phase comprising water, a hydraulic cement and one or more particulate materials that swell upon contact with a water immiscible fluid such as a hydrocarbon. The internal phase of such systems is typically a water-immisicible fluid.

The asphaltite-mineral particles may be further associated with one or more compounds from the list comprising an aqueous inverse emulsion of polymer comprising a betaine group, poly-2,2,1-bicyclo heptene (polynorbornene), alkylstyrene, crosslinked substituted vinyl acrylate copolymers, diatomaceous earth, natural rubber, vulcanized rubber, polyisoprene rubber, vinyl acetate rubber, polychloroprene rubber, acrylonitrile butadiene rubber, hydrogenated acrylonitrile butadiene rubber, ethylene propylene diene monomer, ethylene propylene monomer rubber, styrene-butadiene rubber, styrene/propylene/diene monomer, brominated poly (isobutylene-co-4-methylstyrene), butyl rubber, chlorosulphonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulphonated polyethylene, fluoro silicone rubbers, fluoroelastomers, substituted styrene acrylate copolymers, styrene-isoprene-styrene polymers, styrene-butadiene-styrene polymers and bivalent cationic compounds.

The cement compositions may also comprise fibers or ribbons selected from the list comprising polyamide, polyethylene, polypropylene, polyvinyl alcohol and metallic compounds. Other fibers known by those skilled in the art may be incorporated.

Those skilled in the art will appreciate that the disclosed method and use may not necessarily be applied throughout the entire length of the subterranean interval being cemented. In such cases, more than one cement-slurry composition is placed sequentially. The first slurry is called the "lead," and the last slurry is called the "tail." Under these circumstances, it is preferred that the inventive slurry be placed such that it resides in regions where hydrocarbons exist. Those skilled in the art will also appreciate that the disclosed method and use would not only be useful for primary cementing, but also for remedial cementing operations such as squeeze cementing and plug cementing. Such remedial operations may or may not involve pumping the cement slurry. Instead, other placement means including (but not limited to) dump bailers may be employed. Also, hydrocarbons might be injected into the borehole to contact the cement sheath thus triggering the swelling of the particles which will then repair any defect of said cement sheath.

Other and further objects, features and advantages of the present invention will be readily apparent to those skilled in the art upon a reading of the description of the examples which follows, taken in conjunction with the accompanying drawings.

EXAMPLES

The following examples serve to further illustrate the invention.

The asphaltite mineral employed in all of the examples was Gilsonite™ from American Gilsonite Company, Bonanza, Utah, USA. Gilsonite™ is unitaite with a specific gravity of 1.007 as measured by a pycnometer. The particle-size distribution was as follows: D[0.1]=13.0 µm; D[0.5]=94.8 µm; D[0.9]=579.7 µm.

Example 1

The thermal properties of Gilsonite™ were investigated by thermogravimetric analysis (TGA). The TGA instrument was manufactured by TA Instruments, New Castle, Del., USA.

A Gilsonite™ sample was placed in the instrument chamber, and the amount and rate of weight change was measured as a function of temperature. The instrument chamber was filled with a nitrogen atmosphere. The thermogram, shown in FIG. 1, shows that the sample gradually lost weight as the temperature rose to about 410° C. At about 464° C., a large weight decrease occurred. The results indicated that, from a thermal-stability standpoint, Gilsonite™ would be suitable for use in most wellbore environments.

Example 2

The swelling behavior of two types of particles was tested inside a pressure cell equipped with a window that allows one to observe the behavior of materials within the cell. The cell supplier was Temco Inc., Houston, Tex., USA. A camera captures images from inside the pressure cell, and image-analysis software is employed to interpret the behavior of materials inside the cell. For particle-size measurements, the software examines the cross-sectional area of the particles in the cell.

Gilsonite™ and petroleum coke particles were tested. During each test, a few particles were introduced into the cell, and the cell was sealed. The initial particle sizes were measured using the image-analysis software. A methane-gas line was then connected to the cell, and the methane pressure was raised to 21 MPa over a 3-min period. The cell pressure was maintained for 2 hr, after which the particle sizes were measured again.

Figure 2:
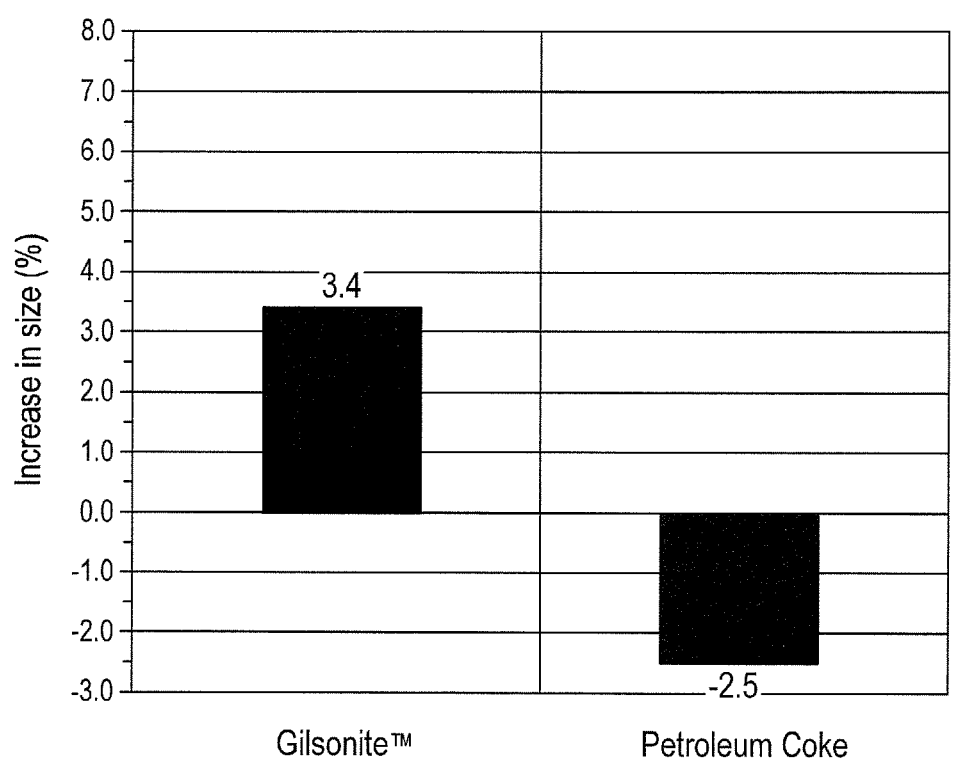
FIG. 2 is a plot showing the swelling behavior of various particles exposed to methane gas.

As shown in FIG. 2, Gilsonite™ swelled in the presence of methane but the size of the petroleum-coke particles decreased.

Example 3

Two cement formulations containing a swelling particle were evaluated for their self-healing properties at ambient temperature and pressure. The slurry compositions are presented in Table 1.

TABLE 1

| Slurry Compositions for Self-Healing Tests. | | | |
|---|---|---|---|
| | Unit | Cement with petroleum coke | Cement with Gilsonite ™ |
| Slurry Density | (kg/m³) | 1606 | 1606 |
| SVF | (%) | 48.2 | 48.3 |
| Swelling Particle | (kg/m³) | 222 | 222 |
| Class G Cement | (kg/m³) | 720 | 720 |
| Silica | (kg/m³) | 144 | 144 |
| Water | (kg/m³) | 508 | 508 |
| Antifoam Agent | (kg/m³) | 5 | 5 |
| Dispersant | (kg/m³) | 3.5 | 3.5 |
| Antisettling Agent | (kg/m³) | 1.1 | 1.1 |
| Retarder | (kg/m³) | 0 | 0 |

The additive compositions were as follows: antifoam agent: polypropylene glycol; dispersant: polynapthalene sulfonate; antisettling agent: 90% crystalline silica, 10% polysaccharide biopolymer; retarder: calcium lignosulfonate. The swelling-particle concentrations may be expressed as a percentage by volume of the cement blend (BVOB). The petroleum-coke concentration was 50% BVOB, and the Gilsonite™ concentration was 42% BVOB. The solid-volume fractions of the slurries were adapted such that both slurries had the same density—1608 kg/m³ (13.4 lbm/gal).

Each cement slurry was prepared according to the method described in ISO Publication 10426-2, and samples were prepared in the manner required to perform a Brazilian tensile-strength test. This test is also described in ISO Publication 10426-2. The cement-core samples were 66 mm long and 22 mm in diameter. The samples were cured at room temperature and atmospheric pressure for periods given in Table 2.

TABLE 2

Curing times for cement slurries containing swelling particles.

| Swelling Particle | Gilsonite™ | Petroleum Coke |
|---|---|---|
| Curing time (days) | 7 | 15 |

Figure 3:
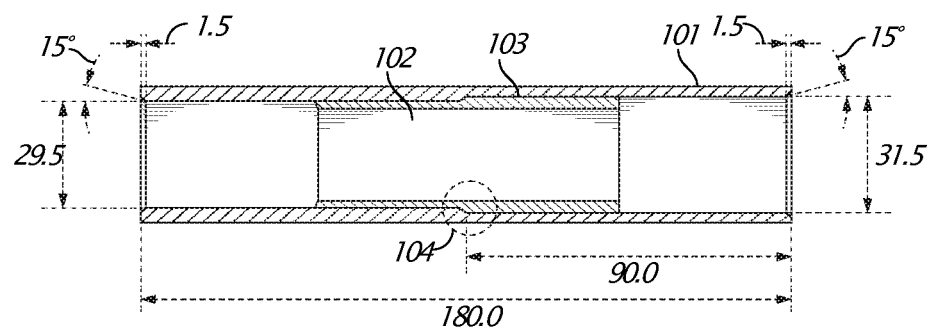
FIG. 3 is a schematic diagram of a tube for exposing fractured cement samples to a flowing gas, and measuring the effect of gas exposure on flow-rate reduction.

The samples were fractured by the Brazilian method, then transferred to a steel tube and secured by a sealing cement. As shown in FIG. 3, the steel tube 101 is 180 mm long. There are two 90-mm sections—one with an internal diameter of 31.5 mm in diameter, the other with an internal diameter of 29.5 mm. The fractured cement sample 102 is placed inside the tube and the sealing cement 103 is applied around the sample. Midway along the cement sample, owing to the different tube diameters, there is an edge 104 to prevent the cement sample from sliding.

The composition of the sealing cement was a 1.88 kg/m$^3$ Portland cement slurry containing 2.7 mL/kg polynaphthalene sulfonate dispersant, 2.7 mL/kg polysiloxane antifoam agent, 178 mL/kg styrene butadiene latex and 2.1% by weight of cement calcium chloride accelerator.

Figure 4:
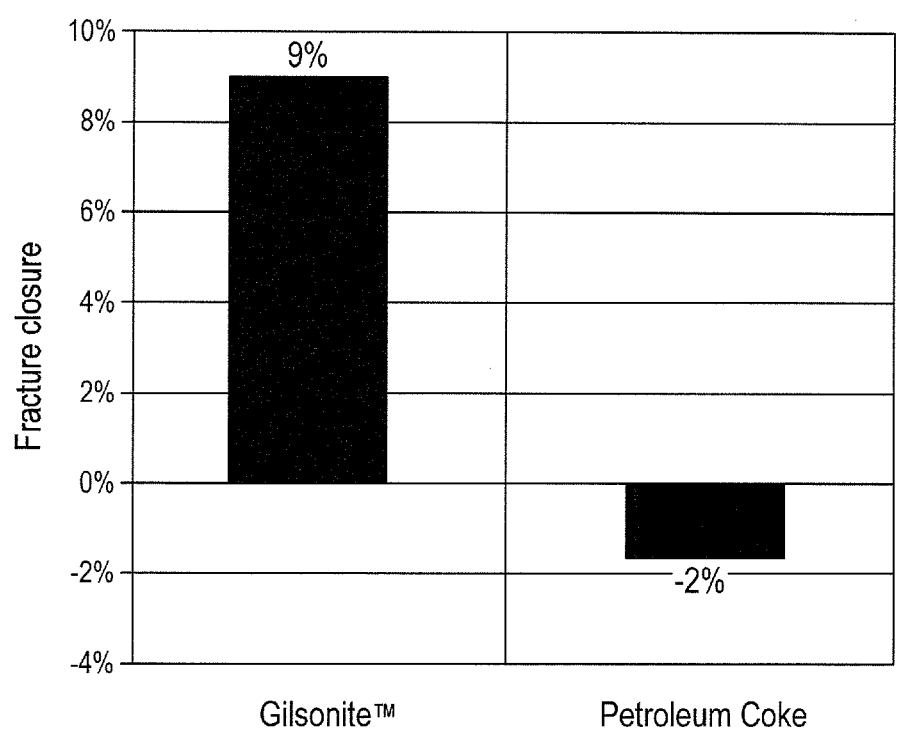
FIG. 4 is a plot depicting the ability of various particles to close fractures in cement samples containing swellable particles and exposed to butane gas.

Nitrogen was injected into the tube at ambient temperature (20°-23° C.) and about 43-bar (3 psi) pressure. The baseline nitrogen flow rate was measured. Butane was then injected through the fractured samples at ambient temperature and pressure for two hours. Nitrogen was again introduced into the cell and the flow rate was measured. The flow-rate reduction was proportional to the fracture closure arising from particle swelling. The results, shown in FIG. 4, demonstrate that the Gilsonite™ particles swelled to a greater degree than the petroleum coke.

The invention claimed is:

1. A method for maintaining zonal isolation in a subterranean well in which a borehole penetrates one or more hydrocarbon-containing formations, comprising:
   (i) pumping a cement slurry into the well, the slurry comprising particles comprising one or more asphaltite minerals; and
   (ii) allowing the cement slurry to set to form a cement sheath;
   (iii) allowing microannuli, cracks or defects to occur in the cement sheath;
   (iv) allowing hydrocarbons to contact the asphaltite-particle surfaces; and
   (v) allowing the particles to swell, thereby enabling the cement sheath to self-repair.

2. The method of claim 1, wherein the particles comprise uintaite.

3. The method of claim 1, wherein the concentration of the particles is between about 10% and 75% by volume of cement-slurry solids.

4. The method of claim 1, wherein the size of the particles is between about 50 μm and 900 μm.

5. The method of claim 1, wherein the particles are further associated with one or more members selected from the group consisting of an aqueous inverse emulsion of polymer comprising a betaine group, poly-2,2,1-bicyclo heptene (polynorbornene), alkylstyrene, crosslinked substituted vinyl acrylate copolymers, diatomaceous earth, natural rubber, vulcanized rubber, polyisoprene rubber, vinyl acetate rubber, polychloroprene rubber, acrylonitrile butadiene rubber, hydrogenated acrylonitrile butadiene rubber, ethylene propylene diene monomer, ethylene propylene monomer rubber, styrene-butadiene rubber, styrene/propylene/diene monomer, brominated poly(isobutylene-co-4-methylstyrene), butyl rubber, chlorosulfonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulfonated polyethylene, fluoro silicone rubbers, fluoroelastomers, substituted styrene acrylate copolymers, styrene-isoprene-styrene polymers, styrene-butadiene-styrene polymers and bivalent cationic compounds.

6. The method of claim 1, wherein the hydrocarbon comprises at least 80 mol % methane.

7. The method of claim 1, wherein the hydrocarbon pressure to which the set cement is exposed is higher than about 11 MPa.

8. A method of using an asphaltite-mineral particles to impart self-healing properties to a cement composition comprising:
   (i) forming a cement composition comprising an asphaltite-mineral;
   (ii) placing said cement composition in a subterranean well penetrating one or more hydrocarbon-containing formations; and
   (iii) allowing the cement composition to set and form a cement sheath wherein the asphaltite-mineral particle surfaces may contact hydrocarbons should microannuli, cracks or defects occur in the cement sheath.

9. The method of claim 8, wherein the particles comprise unitaite.

10. The method of claim 8, wherein the concentration of the particles is between about 10% and 75% by volume of cement-slurry solids.

11. The method of claim 8, wherein the size of the particles is between about 50 μm and 900 μm.

12. The method of claim 8, wherein the particles are further associated with one or more members selected from the group consisting of an aqueous inverse emulsion of polymer comprising a betaine group, poly-2,2,1-bicyclo heptene (polynorbornene), alkylstyrene, crosslinked substituted vinyl acrylate copolymers, diatomaceous earth, natural rubber, vulcanized rubber, polyisoprene rubber, vinyl acetate rubber, polychloroprene rubber, acrylonitrile butadiene rubber, hydrogenated acrylonitrile butadiene rubber, ethylene propylene diene monomer, ethylene propylene monomer rubber, styrene-butadiene rubber, styrene/propylene/diene monomer, brominated poly(isobutylene-co-4-methylstyrene), butyl rubber, chlorosulfonated polyethylenes, polyacrylate rubber, polyurethane, silicone rubber, brominated butyl rubber, chlorinated butyl rubber, chlorinated polyethylene, epichlorohydrin ethylene oxide copolymer, ethylene acrylate rubber, ethylene propylene diene terpolymer rubber, sulfonated polyethylene, fluoro silicone rubbers, fluoroelastomers, substituted styrene acrylate copolymers, styrene-isoprene-styrene polymers, styrene-butadiene-styrene polymers and bivalent cationic compounds.

13. The method of claim 8, wherein the hydrocarbon comprises at least 80 mol % methane.

14. The method of claim 8, wherein the hydrocarbon pressure to which the set cement is exposed is higher than about 11 MPa.

15. A method of cementing a well in which a borehole penetrates one or more hydrocarbon-containing formations, comprising:
   (i) placing into the well a cement slurry comprising particles comprising one or more asphaltite minerals;
   (ii) allowing the cement slurry to set to form a cement sheath;

wherein, should microannuli, cracks or defects occur in the cement sheath, allowing hydrocarbons from the formation to contact the particle surfaces, allowing the particles to swell, and enabling the cement sheath to self-repair.

16. The method of claim 15, wherein the particles comprise unitaite.

17. The method of claim 15, wherein the size of the particles is between about 50 µm and 900 µm.

18. The method of claim 15, wherein the hydrocarbon comprises at least 80 mol % methane.

19. The method of claim 15, wherein the hydrocarbon pressure to which the set cement is exposed is higher than about 11 MPa.

\* \* \* \* \*